United States Patent
Brants et al.

(10) Patent No.: US 7,529,765 B2
(45) Date of Patent: May 5, 2009

(54) METHODS, APPARATUS, AND PROGRAM PRODUCTS FOR PERFORMING INCREMENTAL PROBABILISTIC LATENT SEMANTIC ANALYSIS

(75) Inventors: Thorsten H. Brants, Palo Alto, CA (US); Ioannis Tsochantaridis, Peristeri (GR); Thomas Hofmann, Darmstadt (DE); Francine R. Chen, Menlo Park, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 422 days.

(21) Appl. No.: 10/996,873

(22) Filed: Nov. 23, 2004

(65) Prior Publication Data

US 2006/0112128 A1    May 25, 2006

(51) Int. Cl.
    G06F 7/00 (2006.01)
(52) U.S. Cl. ............................. 707/102; 707/5; 715/267
(58) Field of Classification Search ...................... 707/5, 707/102; 715/267
    See application file for complete search history.

(56) References Cited

U.S. PATENT DOCUMENTS

| | | | |
|---|---|---|---|
| 6,477,524 B1 * | 11/2002 | Taskiran et al. ................. | 707/2 |
| 6,687,696 B2 | 2/2004 | Hofmann et al. | |
| 6,728,695 B1 * | 4/2004 | Pathria et al. .................. | 707/2 |
| 6,738,781 B1 * | 5/2004 | Mustoe et al. ............... | 707/102 |
| 2002/0107853 A1 * | 8/2002 | Hofmann et al. ............... | 707/7 |
| 2003/0177112 A1 | 9/2003 | Gardner | |
| 2003/0182631 A1 * | 9/2003 | Tsochantaridis et al. .... | 715/531 |
| 2004/0024598 A1 | 2/2004 | Srivastava et al. | |
| 2004/0034652 A1 | 2/2004 | Hofmann et al. | |
| 2004/0034665 A1 * | 2/2004 | Haase ...................... | 707/104.1 |
| 2004/0073554 A1 | 4/2004 | Cooper et al. | |
| 2004/0088308 A1 * | 5/2004 | Bailey et al. ................. | 707/100 |
| 2004/0113953 A1 | 6/2004 | Newman | |
| 2004/0113954 A1 | 6/2004 | Newman | |
| 2004/0117340 A1 | 6/2004 | Blitzer | |
| 2004/0117448 A1 | 6/2004 | Newman et al. | |
| 2004/0117449 A1 | 6/2004 | Newman et al. | |
| 2004/0117725 A1 | 6/2004 | Chen et al. | |
| 2004/0117736 A1 | 6/2004 | Newman | |
| 2004/0117740 A1 | 6/2004 | Chen et al. | |
| 2004/0122657 A1 | 6/2004 | Brants et al. | |

OTHER PUBLICATIONS

Cohn, David and Hoffman, Thomas "The Missing Link—A Probabilistic Model of Document Content and Hypertext Connectivity," NIPS' 2000, vol. 13, Todd Leen, Tom Dietterich, Volker Tresp (eds.), MIT Press, 2001.

Friedman, Nir, "The Bayesian Structural EM Algorithm," Proceedings of the 14th Annual Conference on Uncertainty in Artificial Intelligence (UAI-98), Morgan Kaufmann Publishers, San Francisco, California, 1998, pp. 129-138.

(Continued)

*Primary Examiner*—Hosain T Alam
*Assistant Examiner*—Jieying Tang
(74) *Attorney, Agent, or Firm*—Fay Sharpe LLP (57) ABSTRACT

One aspect of the invention is that of efficiently and incrementally adding new terms to an already trained probabilistic latent semantic analysis (PLSA) model.

26 Claims, 3 Drawing Sheets

OTHER PUBLICATIONS

Blei, David M. and Jordan, Michael I., "Modeling Annotated Data," Report No. UCB/CSD-02-1202, Jan. 2003, Computer Science Division (EECS), University of California, Berkeley, California.

Hofmann, Thomas, "Probabilistic Latent semantic Analysis," Proceedings of Uncertainty in Artificial Intelligence, UAI '99, Stockholm, Jul. 1999.

Hofmann, Thomas, "Probabilistic Latent Semantic Indexing," SIGIR '99: Proceedings of the 22$^{nd}$ Annual International ACM SIGIR Conference on Research and Development in Information Retrieval, Aug. 15-19, 1999, Berkeley, CA, USA. ACM 1999.

Kolenda, Thomas and Hanse, Lars Kai, "Independent Components in Text," submitted to NIPS '99 and published as Technical Report for Department of Mathematical Modeling, Technical University of Denmark, 1999.

* cited by examiner

METHODS, APPARATUS, AND PROGRAM PRODUCTS FOR PERFORMING INCREMENTAL PROBABILISTIC LATENT SEMANTIC ANALYSIS

BACKGROUND OF THE INVENTION

1. Field of the Invention

This invention relates generally to data processing systems and more specifically to incrementally adding terms to a trained probabilistic latent semantic analysis (PLSA) model.

2. Background

Latent Semantic Analysis (LSA) is often used before the classification or retrieval of information.

Probabilistic Latent Semantic Analysis (PLSA) has been shown empirically for a number of tasks to be an improvement to LSA. PLSA is a statistical latent class (or aspect) model that provides excellent results in several information retrieval related tasks. PLSA has the positive feature of assigning probability distributions over latent classes to both documents and terms. Most other clustering techniques do a hard assignment to only one class and/or cluster based only on one aspect (for example, only on terms or only on documents). Aspect models are also successfully used in other areas of natural language processing such as language modeling. PLSA addresses the problems of polysemy and synonymy in natural language processing. In synonymy, different writers use different words to describe the same idea. In polysemy, the same word can have multiple meanings. PLSA was first described by Thomas Hofmann in a paper entitled *Probabilistic Latent Semantic Indexing*, published in the Proceedings of SIGIR-99, pages 35-44 in 1999 and hereby included by reference in its entirety. Additional information about PLSA is disclosed in U.S. Pat. No. 6,687,696, that issued on Feb. 3, 2004 by Hofmann et al. entitled "System and method for personalized search, information filtering, and for generating recommendations utilizing statistical latent class models," also hereby included by reference in its entirety.

The PLSA model is fitted to training data by using the Expectation Maximization (EM) algorithm. PLSA assigns probability distributions over latent classes to both terms and documents and thereby allows terms and/or documents to belong to more than one latent class, rather than to only one class as is true of many other classification methods. PLSA models represent the joint probability of a document d and a word w based on a latent class variable z as:

$$P(d, w) = P(d) \sum_z P(w|z) P(z|d) \qquad (1)$$

that can be read as the probability of document d term w P(d,w), is equal to the probability of document d, P(d), times the sum over the latent classes of the probability of term w given latent class z, P(w|z), times the probability of latent class z given document d, P(z|d).

The PLSA model for generation is: a document within a document collection (d∈D) is chosen with probability P(d). For each word in document d, a latent class within the latent class collection (z∈Z) is chosen with probability P(z|d) that in turn is used to choose a term from the term collection (w∈W) with probability P(w|z).

A PLSA model is trained by fitting the model to the document collection D by maximizing the log-likelihood function L:

$$L = \sum_{d \in D} \sum_{w \in d} f(d, w) \log P(d, w) \qquad (2)$$

Where f(d,w) represents the number of times w occurs in d.

Maximization can be done by applying the expectation step (the E-step) in the EM-algorithm. The E-step is:

$$P(z|d, w) = \frac{P(z|d)P(w|z)}{\sum_{z'} P(z'|d)P(w|z')} \qquad (3)$$

The maximization step (the M-step) is:

$$P(w|z) = \frac{\sum_d f(d, w)P(z|d, w)}{\sum_{d,w'} f(d, w')P(z|d, w')} \qquad (4)$$

$$P(z|d) = \frac{\sum_w f(d, w)P(z|d, w)}{\sum_{w,z'} f(d, w)P(z'|d, w)} \qquad (5)$$

The E and M steps are alternately applied in the EM algorithm.

The parameters in the trained PLSA model can be accessed to determine relationships (such as similarities) between the documents that are known to the model (for example, between any subset, including the entire set, of documents composed of the set of those documents that were in the initial training set and those documents that have been folded-in to the trained PLSA model after the model was trained). In addition, a new document (a query document) can be added to the trained PLSA model by the folding-in process (subsequently described). The probabilities that the query document matches other of the documents in the model can be determined from the model parameters once the query document has been folded-in. Folding-in does not add new terms from the query document into the trained PLSA model.

Equations 1-4 use a parameterization based on P(z|d) instead of the parameterization P(d|z) used in the Hofmann paper. However, the P(z|d) parameterization allows an identical representation of the EM-algorithm to be used for both training and folding-in and thus this representation is advantageous.

The parameters of the PLSA model can be accessed and used to prepare a result responsive to and/or based on the current state of the model. The parameters (for example, P(z|d)) can also be compared between documents to find similarities between the documents in the set of documents D. This allows high quality associations between documents not necessarily based on similar words, but based on similar concepts per the latent classes.

Folding-in is the process of computing a representation (for example, a smoothed term vector) for a query document q and adding that representation into the trained PLSA model. The folding-in process results in a new P(z|d) parameter related to the representation of the query document. New terms in the query document are not added to the trained PLSA model by the folding-in process. New terms in the query document (and the document representation itself) are only included in the prior art PLSA model when the model is re-retrained.

At the start of the training process, the parameters (P(w|z) and P(z|d)) are either initialized randomly, uniformly or according to some prior knowledge. One skilled in the art will understand that during training, the E and M-steps are repeatedly applied until the parameters stabilize. Stabilization can be determined by using some threshold on characteristics of the model, such as the change in the log-likelihood, L, (equation 2) or the change in the parameters, or by capping the number of iterations. One skilled in the art will understand that stabilization conditions can be empirically determined.

A folding-in process uses the parameters P(w|z) obtained by the training process to determine the probability of a latent class conditioned on a query document, P(z|q); that is, roughly, the extent to which the query document (for example, a document or query string q) is characterized by the "topic" represented by the latent class, for each latent class in the set of latent classes. Folding-in uses the EM-algorithm as in the training process; the E-step is identical, the M-step keeps all the P(w|z) constant and re-calculates P(z|q) (the probability of the latent class given the query document). Usually, only a small number of iterations of the E- and M-steps are sufficient for the folding-in process.

As can be seen in the M-step, calculation of each P(z|d) for folding-in does not require summation over all documents d in the training collection (as the summations in equation 5 are over w and z' and not over d). In particular, it allows a query document q to be added independently of other documents d (known to the model) if the model parameters P(w|z) are kept constant.

The M-step for the model parameters P(w|z), however, requires summation over all documents d (as shown by equation 4). Therefore, a run over the complete training collection (including those documents that have been folded-in) is required if we want to update the trained PLSA model with new terms or to change an existing parameter. This is memory and time inefficient and thus can not be reasonably performed in an on-line or real-time environment.

A further disadvantage of the PLSA model can also be seen in the M-step. The PLSA model parameters satisfy:

$$\sum_{w \in W} P(w|z) = 1 \qquad (6)$$

for each z, which implies P(w|z)=0 for each w∉W. This is a sum (equal to one) over a set of trained terms, of a plurality of probabilities that each member within the set of trained terms belongs to a latent class z. Therefore, the model cannot incorporate new terms that did not occur in the original training set and thus do not exist in W. Thus, new terms from a folded-in document are ignored.

There are problems with the PLSA model; one problem is the inability to add new terms (words not seen in the training set) to the model without retraining; another problem is that updating model parameters requires a run over the complete training data as well as the folded-in data and this process is inefficient. In applications where new documents are continually being folded-in to the model (such as newspaper articles, technical articles, etc., as well as transcripts of communication intercepts) terms newly defined in the folded-in documents are not incorporated into the model until the model is retrained. Thus, the model parameters can become less accurate as new documents are folded-in to the model.

It would be advantageous to address these problems.

BRIEF DESCRIPTION

A computer controlled method is provided which includes identifying at least one new term from a document to be added to a trained probabilistic latent semantic analysis (PLSA) model, incrementally adding at least one identified term to the trained PLSA model, and presenting a model parameter from the trained PLSA model.

A computer program product is also provided which includes a computer-usable data carrier storing instructions that, when executed by a computer, cause the computer to perform a method. The method includes identifying at least one new term from a document to be added to a trained probabilistic latent semantic analysis (PLSA) model, incrementally adding at least one identified term to the trained PLSA model, and presenting a model parameter from the trained PLSA model.

An apparatus having a central processing unit (CPU) and a memory coupled to the CPU is further provided. The apparatus includes term identification logic configured to identify at least one new term from a document to be added to a trained probabilistic latent semantic analysis (PLSA) model, term addition logic configured to incrementally add at least one identified term to the trained PLSA model, and presentation logic configured to present a model parameter from the trained PLSA model.

DESCRIPTION OF THE PREFERRED EMBODIMENTS

One aspect of the invention is that of incrementally adding terms to a trained probabilistic latent semantic analysis (PLSA) model. It is incremental in that the trained PLSA model is not retrained to provide parameters related to the new terms that are added and there is no need to run over all previously seen data to update the trained PLSA model. The parameters of the trained PLSA model can be accessed to determine relationships between the documents that have been incorporated into the trained PLSA model either by training, traditional folding-in and/or by incrementally adding new terms and documents to the trained PLSA model.

Figure 1:
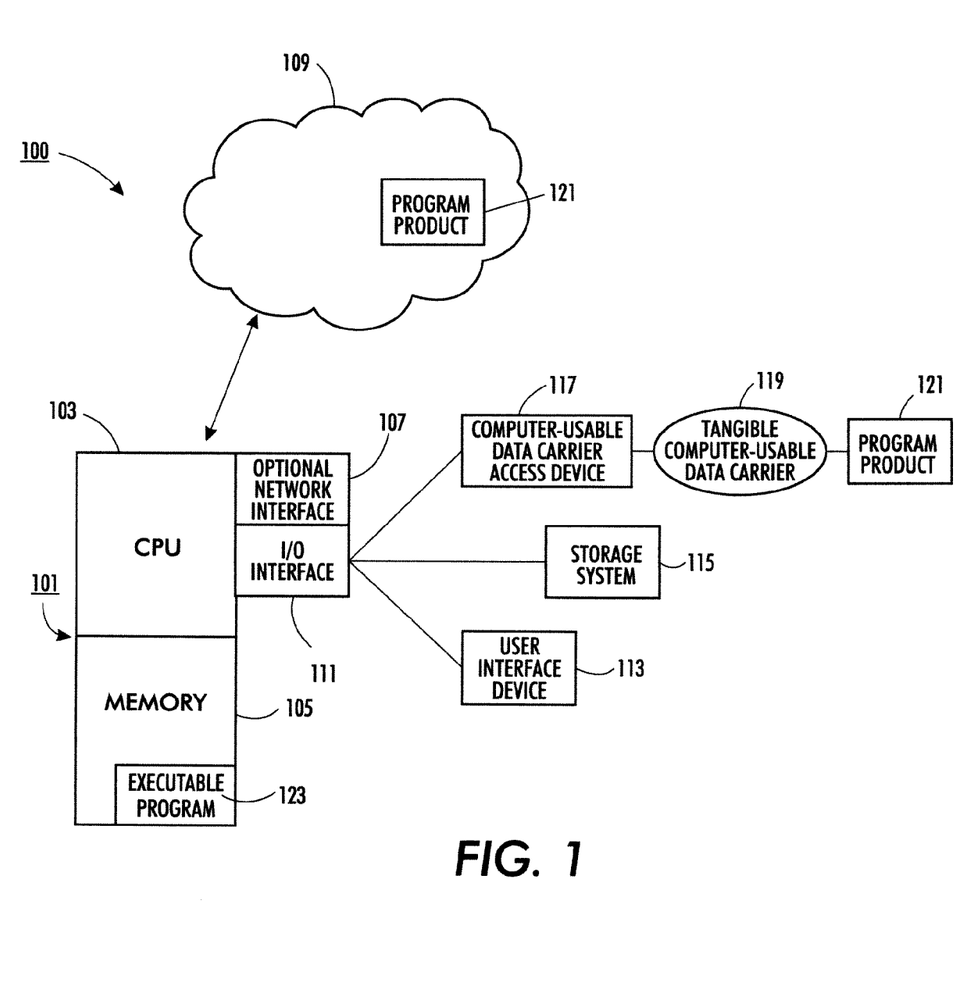
FIG. 1 illustrates a computer system that can be used with an embodiment.

FIG. 1 illustrates a computer system 100 that can incorporate the invention. The computer system 100 includes a computer 101 that incorporates a CPU 103, a memory 105, and an optional network interface 107. The optional network interface 107 can provide the computer 101 with access to a network 109. The computer 101 also can include an I/O interface 111 that can be connected, for example, to a user interface device(s) 113, a storage system 115, and a computer-usable data carrier access device 117. The computer-usable data carrier access device 117 can read a tangible computer-usable data carrier 119 that typically contains a program product 121. The storage system 115 (along with the computer-usable data carrier access device 117 and the tangible computer-usable data carrier 119) comprise a file storage mechanism. The program product 121 on the tangible computer-usable data carrier 119 is generally read into the memory 105 as an executable program 123. In addition, the program product 121 can be provided from the network (often encoded within an electromagnetic carrier wave—including light, radio, and electronic signaling, but can also be transported through a network using means other than a carrier wave) through the optional network interface 107. Thus, the network is also a computer-usable data carrier. One skilled in the art will understand that not all of the displayed features of the computer 101 need to be present to support the invention.

In an online setting the ability to add new terms to a trained probabilistic latent semantic analysis (PLSA) model is highly desirable. The ability to expand the vocabulary of terms used by the trained PLSA model beyond the (possibly small) vocabulary obtained from an initial training set allows the vocabulary of a PLSA model to gradually grow without the need to perform a high-overhead retraining operation for each new set of terms.

Incremental PLSA is an improvement to the existing PLSA algorithm. This inventive improvement provides for the incorporation of new terms into an already trained PLSA model without the need to re-process the complete training and/or folded-in collections as has been required by the prior art.

Figure 2:
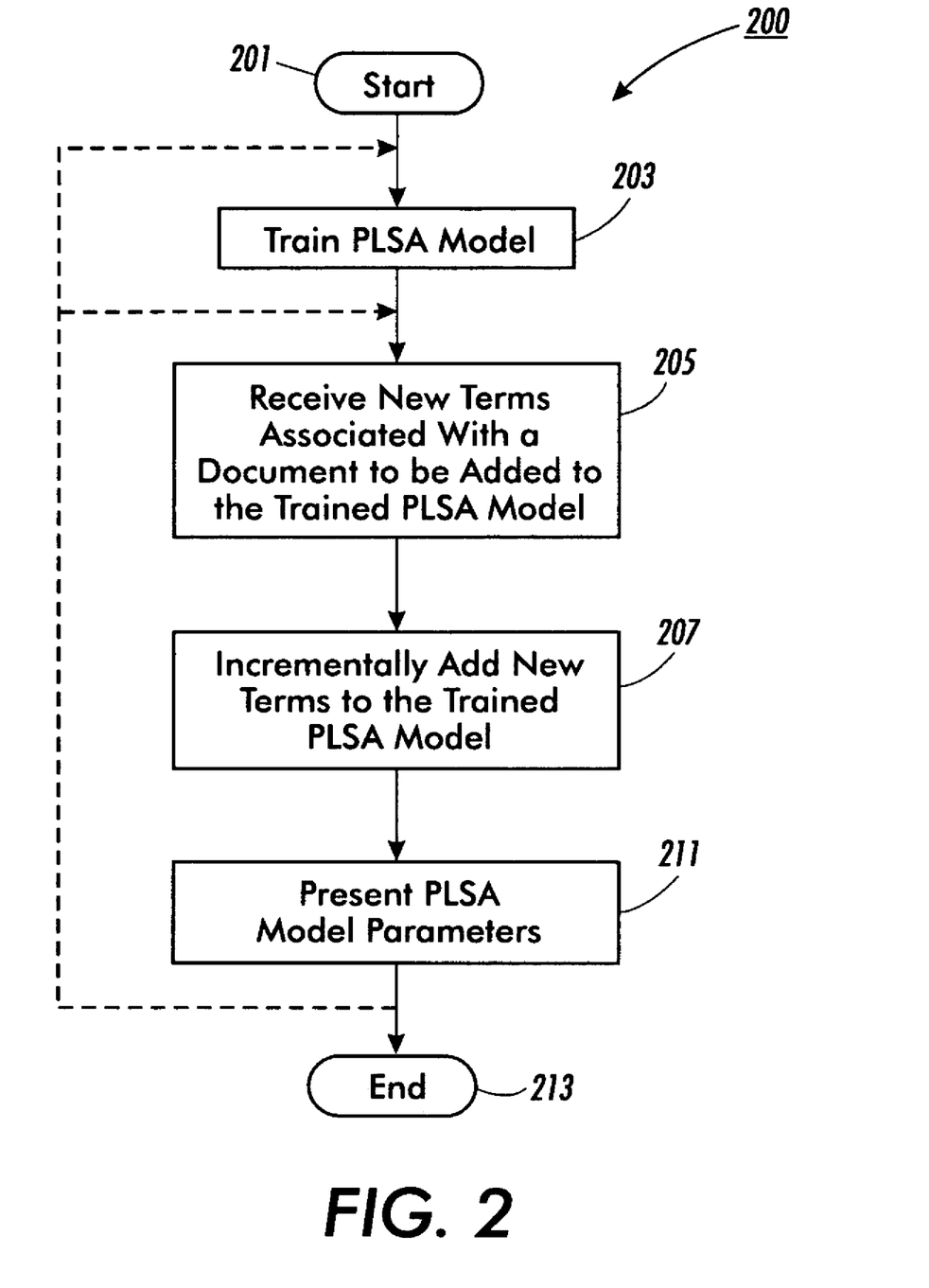
FIG. 2 provides an overview of an incremental PLSA process.

FIG. 2 illustrates an incremental PLSA process 200 and shows steps that can be used to add new terms to trained PLSA models. The incremental PLSA process 200 starts at a start terminal 201 and continues to a 'train PLSA model' procedure 203 where the PLSA model is trained using techniques known to one skilled in the art and previously described. A 'receive new terms' procedure 205 receives new terms associated with a new document or query document to be added to the trained PLSA model. Once the new terms have been received (usually as part of a query document that contains new terms), an 'incrementally add new terms' procedure 207 adds these terms to the trained PLSA model. The 'incrementally add new terms' procedure 207 also folds-in the query document into the trained PLSA model. At the completion of the 'incrementally add new terms' procedure 207 the model parameters from the trained PLSA model can be used to determine relationships between documents, terms and/or latent classes. These relationships can be presented by a 'present model parameter' procedure 211 and the incremental PLSA process 200 completes through an end terminal 213.

Optionally, additional new terms can be added to the trained PLSA model by having the incremental PLSA process 200 loop back to the 'receive new terms' procedure 205. In addition, on an as-needed basis, the incremental PLSA process 200 can repeat back to the 'train PLSA model' procedure 203 to retrain the model to re-incorporate documents that have been folded-in to the model. One skilled in the art will understand that this retraining is the prior art method of adding new terms and documents to the model. Such a one will also understand that retraining removes inaccuracies due to approximations if not all model parameters are updated (see the subsequent discussion about M1 and M2 embodiments).

The process of incrementally adding new terms also folds-in the query document containing the new terms. Some embodiments allow the user to specify whether a query document is to be folded into the trained PLSA model in the traditional manner (that is, without incorporating new terms) or whether the model is to both add new terms and fold-in the query document.

A query document can be a document containing existing or new terms, as well as simply a string of terms. The terms in a query document can be stemmed, have stopwords removed, or otherwise expanded, contracted or processed as appropriate for the application and the needs of the user. These preprocessing steps should be the same as are performed on the documents used for training the model. The query document is folded-into the trained PLSA model (with or without updating the terms known to the trained PLSA model). This changes the parameters in the trained PLSA model and, as in existing PLSA models, these parameters can be used to correlate the terms, latent classes and documents known to the model.

The 'present model parameter' procedure 211 can "present" the model parameters in many ways. We envision the meaning of presentation to include directly or indirectly using the model parameters. For example, but without limitation, presentation includes the concepts of displaying model parameter values and/or correlations from the model to a user numerically, graphically, or otherwise; displaying information or situations by a computer application that uses the model parameter values; storing model parameter values (or information derived from the model parameter values) to a file system; and of using the model parameter values by a computer program other than the model itself.

One skilled in the art will understand that, although the incremental PLSA process 200 was presented in a linear, sequential fashion, once the PLSA model is trained, many query documents can be folded into the model. Further, such a one will understand that there can be multiple invocations of the 'incrementally add new terms' procedure 207 to add additional terms as needed to the trained PLSA model. Such a one will also understand that a procedure is a self-consistent sequence of computerized steps that lead to a desired result. These steps can be defined by one or more computer instructions. These steps can be performed by a computer executing the instructions that define the steps. Thus, the term "procedure" can refer (for example, but without limitation) to a sequence of instructions, a sequence of instructions organized within a programmed-procedure or programmed-function, or a sequence of instructions organized within programmed-processes executing in one or more computers. Such a procedure can also be implemented directly in circuitry that performs the steps. Thus, a programmed computer, special purpose circuitry and some combination of programmed computer and special purpose circuitry are embodiments of logic that can perform or cause the steps to be performed. Thus for example, "term addition logic" provides the circuitry, procedure executed by a computer, or combination of these that effect the step of incrementally adding the at least one new term to the trained PLSA model.

Two approaches that can be used to implement the 'incrementally add new terms' procedure 207 are subsequently described. A first approach is for adding new terms to a trained PLSA model where the model is parameterized by $P(w|z)$. This approach uses re-normalization and the EM-algorithm of the previously described parameterization of the PLSA model. A second approach for adding new terms into a trained PLSA model recasts the previously described PLSA algorithm and the corresponding steps of the EM-algorithm into a form parameterized by $P(z|w)$ instead of $P(w|z)$. Incrementally adding terms to this parameterization of the PLSA algorithm does not require renormalization because $P(z|w)$ is independent of the other terms (w).

In the first approach for adding new terms into a trained PLSA model that is parameterized by P(w|z), we note that the model parameters must satisfy the relationship of equation (6) for each latent class z. Thus, P(w|z)=0 for each w∉W and that means there is no probability mass with which to incorporate new terms ($w_{new}$) into the trained PLSA model.

To reallocate probability mass we assign initial probabilities P($w_{new}$|z) to the new terms, renormalize all of the existing trained terms $P^{orig}(w_{orig}|z)$ to $P^{adj}(w_{orig}|z)$ as shown in equation (8) (thus, allocating some probability mass for the new terms), and determine the probability for the new terms (at least one new term) for $P^{adj}(w_{new}|z)$ as in equation (9). Once the probability mass is allocated, and initial probabilities assigned to the new terms, the previously described EM-algorithm (equations 3-5) is again applied to the model (thus processing each d in the training and folded-in sets). One skilled in the art will understand that application of the EM-algorithm will change the probability of a term given a latent class $P^{adj}(w|z)$ for both the new and previously trained terms ($w_{orig}$ and $w_{new}$). The renormalization is:

$$W^{adj} = W^{orig} \cup W^{new} \quad (7)$$

$$P^{adj}(w_{orig}|z) = \frac{P^{orig}(w_{orig}|z)}{1 + \sum_{w'_{new}} g(w'_{new}, z)} \quad (8)$$

$$P^{adj}(w_{new}|z) = \frac{g(w_{new}, z)}{1 + \sum_{w'_{new}} g(w'_{new}, z)} \quad (9)$$

where g($w'_{new}$,z) is a function for assigning a probability to $w_{new}$ in latent class z (for example, g($w'_{new}$,z) can be simply set to a small ε for all $w'_{new}$ and z).

Figure 3:
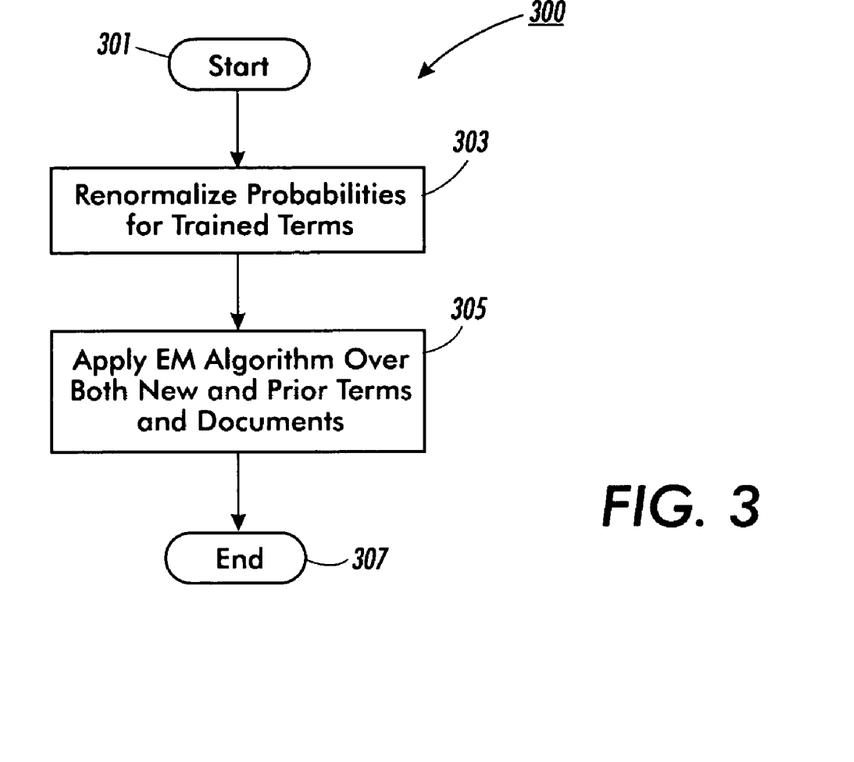
FIG. 3 illustrates a first process for incrementally adding new terms to a trained probabilistic latent semantic analysis (PLSA) model.

FIG. 3 illustrates a process for incrementally adding terms to a trained PLSA model 300 that can be invoked by the 'incrementally add new terms' procedure 207 of FIG. 2, that initiates at a start terminal 301 and that continues to a 'renormalization' procedure 303. The 'renormalization' procedure 303 applies the renormalization of equations 7-9. Once the renormalization is complete, an 'apply EM algorithm' procedure 305 applies equations 3-5 until the parameters stabilize. At this point, the trained PLSA model has incorporated the additional terms and the process for incrementally adding terms to a trained PLSA model 300 completes through the end terminal 307. As was previously described, stabilization can be determined by using some threshold on characteristics of the model, such as the change in the log-likelihood, L, (equation 2) or the change in the parameters, or by capping the number of iterations. One skilled in the art will understand that stabilization conditions can be empirically determined.

In the second approach for adding new words, we note that the PLSA model can be re-parameterized using P(z|w) instead of P(w|z) resulting in a PLSA representation of the form:

$$P(d, w) = P(d) \sum_z \frac{P(z|w)P(w)P(z|d)}{P(z)} \quad (10)$$

The corresponding equations for the re-parameterized EM-algorithm include the E-step:

$$P(z|d, w) = \frac{P(z|d)P(z|w)/P(z)}{\sum_{z'} P(z'|d)P(z'|w)/P(z')} \quad (11)$$

and the M-step:

$$P(z|w) = \frac{\sum_d f(d, w)P(z|d, w)}{\sum_{d,z'} f(d, w)P(z'|d, w)} \quad (12)$$

$$P(z|d) = \frac{\sum_w f(d, w)P(z|d, w)}{\sum_{w,z'} f(d, w)P(z'|d, w)} \quad (13)$$

$$P(z) = \frac{\sum_{d,w} f(d, w)P(z|d, w)}{\sum_{d,w} f(d, w)} \quad (14)$$

This representation of the PLSA model allows us to add a new term ($w_{new}$) by initializing and computing the corresponding P(z|$w_{new}$) without directly affecting P(z|w) for previously existing w because P(z|w) is independent of the other w values (in contrast, for the PLSA model parameterized by P(w|z), changing P(w|z) in equation 4 for one w affects P(w'|z) for all other w'). Thus, the existing model parameters need not change and there is no need to renormalize (as was done in the first approach using equations (7) and (8)). Hence, we no longer need to run the EM-algorithm over the complete training collection to update the PLSA model. The P(z|$w_{new}$) can be initialized (for example, but without limitation) by using a uniform distribution, by some function of P(z) or randomly. One skilled in the art will understand that P(z|w) and P(z|$w_{new}$) may change through iterations of the EM-algorithm (for example when folding-in).

In addition, another parameter P(w) can be updated along with the equations 11-14:

$$P(w) = \frac{\sum_{d,z} f(d, w)P(z|d, w)}{\sum_{d,w} f(d, w)} \quad (15)$$

$$= \frac{\sum_d f(d, w) \sum_z P(z|d, w)}{N}$$

$$= \frac{\sum_d f(d, w) \cdot 1}{N}$$

where N=$\sum_{d,w} f(d,w)$. The summation of P(z|d,w) over all z is equal to unity by definition. Because equation P(w) is independent of z over the set of documents, P(w) only needs to be updated/computed after new terms are added. The update can be as shown by equation (15), or the update can be accomplished by shifting some of the probability mass in a manner analogous to equations 7-9.

Figure 4:
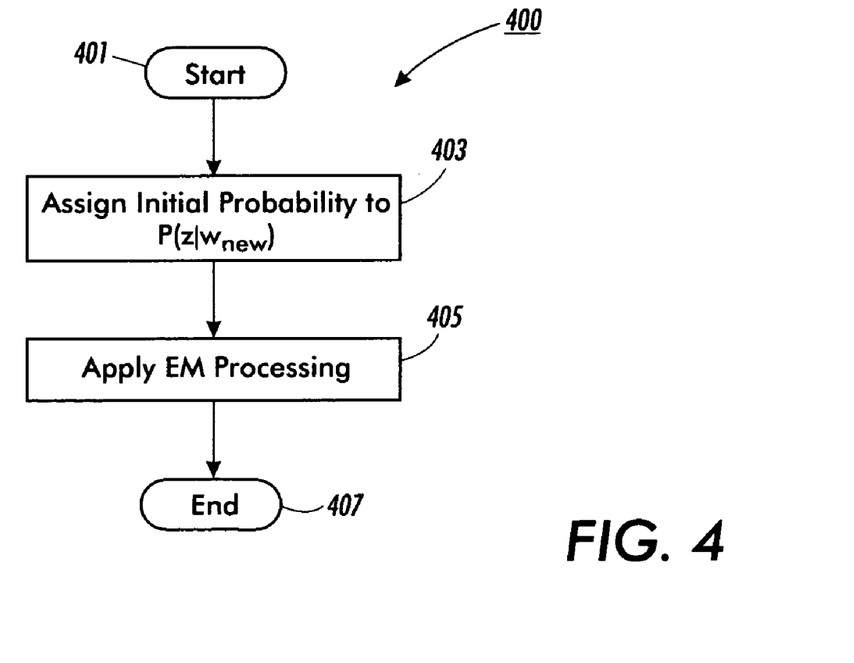
FIG. 4 illustrates a second process for incrementally adding new terms to a trained probabilistic latent semantic analysis (PLSA) model.

FIG. 4 illustrates a process for incrementally adding terms to a trained PLSA model 400 that can be invoked by the 'incrementally add new terms' procedure 207 of FIG. 2. The process for incrementally adding terms to a trained PLSA model 400 initiates at a start terminal 401 and continues to an 'assign initial probabilities procedure 403 that initializes the $P(z|w_{new})$ as above. Next, the process for incrementally adding terms to a trained PLSA model 400 continues to an 'apply EM processing' procedure 405 that applies an appropriate subset of the E and M-step equations of the EM-algorithm of equation 11-14 and optionally 15 until the parameters stabilize after which the process for incrementally adding terms to a trained PLSA model 400 completes through an end terminal 407. The appropriate subset is determined by the selection of parameter update options for M1 and M2 as is subsequently defined with respect to the table of embodiments and including options as to whether to update P(w) and P(z).

PLSA can generate document representations in the low dimensional space P(z|d) as well as in the high dimensional space P(w|d). The high-dimensional representation is derived from the low-dimensional representation by summing over the latent class z:

$$P(w|d) = \sum_z P(w|z)P(z|d) \qquad (16)$$

The original PLSA model (equations (1)-(5)) is parameterized by P(w|z). Generation of document representations in P(z|d) for the PLSA model of equations (10)-(15) can done using the Bayesian inversion:

$$P(w|z) = \frac{P(w)P(z|w)}{P(z)} \qquad (17)$$

The document representation then is:

$$P(w|d) = \sum_z \frac{P(w)P(z|w)}{P(z)} P(z|d) \qquad (18)$$

Where P(w) is updated using:

$$P(w) = \frac{f(w)}{N} \qquad (19)$$

where $f(w) \equiv \sum_d f(d,w)$. Thus, equation 19 is equivalent to the third line of equation (15).

Using the two approaches previously described, we envision at least the following embodiments: Two embodiments using PLSA parameterized using P(z|d) and P(w|z) (these embodiments are based on the first PLSA parameterization previously described and now labeled as M1) and four embodiments using PLSA parameterized using P(z|d) and P(z|w) (these embodiments are based on the second PLSA parameterization previously described and now labeled as M2). Furthermore, all the M2 models can use parameters P(w) and P(z). One skilled in the art would understand how to expand the following table of embodiments to include optionally updating P(w) and/or P(z).

These embodiments either update the P(z|d) parameter values for old documents d, or they keep these parameter values constant.

For the P(z|d) and P(z|w) parameterization of the M2 only: these embodiments either update P(z|w) for old terms w, or they keep these parameter values constant.

Thus, six of the possible embodiments using the M1 and M2 models are:

| E | Model | P(z|d) | P(w|z) | P(z|w) |
|---|-------|--------|--------|--------|
| 1 | M1    | Update | Update | N/A    |
| 2 | M1    | Keep   | Update | N/A    |
| 3 | M2    | Update | N/A    | Update |
| 4 | M2    | Keep   | N/A    | Update |
| 5 | M2    | Update | N/A    | Keep   |
| 6 | M2    | Keep   | N/A    | Keep   |

Updating P(z|d) and P(z|w) for old d and w has the following effects:

New documents $d^{new}$ usually contain a number of old terms w in a new context. This new context can be used to adapt the P(z|w) for old words in order to get representations that incorporate information from the new document $d^{new}$.

Changing P(z|w) usually results in changes of P(z|d) that contain words w for which P(z|w) was changed. Note that through the E-Step, P(z|d) can also change. For exact computations, we need to update all values of P(z|d).

If the preprocessing of the data includes global thresholding (excluding all terms that occur less frequently than a given threshold in the whole collection (for example, only using terms that occur in at least two documents)), then the addition of a new document might move the frequency count of a new term $w_{new}$ above the global threshold. For exact representations, parameters relating to existing documents in the model that contain these terms must be updated.

Updating model parameters can be done in two ways: update all parameters, or update only those parameters that are directly affected by the new documents. Directly affected are P(z|w) or P(w|z) for which term w occurs in at least one of the new documents, and P(z|d) for documents d that contain terms w that also occur in the new documents. Choosing to not update P(z|d) and P(z|w) for old d and w results in approximations. The accuracy of the approximations are sufficient for many practical applications.

Embodiment number 6 keeps P(z|d) and P(z|w) constant and therefore requires the least computation when adding terms into the trained PLSA model of M2. However, this efficiency comes at the cost of also providing the least accurate results. In order to keep inaccuracies small, one can update all parameters after some number of EM steps (thus periodically updating the trained PLSA model in accordance to embodiment number 3 (and also updating P(z) and P(w)) instead of embodiment number 6). Another approach is to periodically re-train the model.

Embodiment number 6 can be further optimized. Instead of keeping P(z) the same or performing a run over all data to calculate P(z) according to equation (14), one can calculate the P(z) by keeping track of the total count N:

$$N^{adj} = N^{old} + \sum_{d^{new} \in D^{new}} \sum_{w \in W^{old} \cup W^{new}} f(d^{new}, w) \quad (20)$$

$$P^{adj}(z) = \frac{N^{old} P^{old}(z) + \sum_{d^{new} \in D^{new}} \sum_{w \in W^{old} \cup W^{new}} f(d^{new}, w) P(z|d^{new}, w)}{N^{adj}} \quad (21)$$

One skilled in the art will understand that the invention allows incremental addition of terms to a trained PLSA model. Thus, a PLSA model can efficiently learn new terms and provide model parameters that incorporate these terms without needing to perform a retraining of the model after every new document is folded-in.

Such a one will also understand that the meaning of "document" is broader than simply a collection of words or terms; instead "document" applies to any collection of information about a topic or entity that includes features describing or identifying characteristics of the topic or entity. For example but without limitation, a document can be about a person, and the features related to the document can be the movies that the person enjoys. In another example, the document can be about an image and the terms can be image features or characteristics (such as color histograms, textures, patterns, etc.). In yet another example the document can be audio vocalizations and the terms can be vocalization-sounds (phones).

From the foregoing, it will be appreciated that the invention has (without limitation) the following advantages:

The ability to add terms to a trained probabilistic latent semantic analysis (PLSA) model without requiring that the entire model be retrained to add the terms, and without requiring a run over all previously seen data.

The ability to use a PLSA model in an on-line application, for an application that requires that new terms be incorporated into the model on an ongoing basis.

The ability to use a PLSA model in a computer application that requires measuring the similarity between two documents when new documents containing new terms need to be frequently added to the model.

These advantages lead to improvements in all applications where a PLSA model has been used as well as opening new areas where the PLSA model has not been appropriate (such as processing up-to-date news articles in a timely manner). For example, but without limitation, the invention can incorporate new terms from a source document having content relating to a news story, an investigation, a transcript, a patent, an advertisement, a statute, a contract, a legal document, a product, an advertisement, a person, a technology, a laboratory, a research center, a technical paper, a device, a policy, a translation, any information encoded into a series of codes (for example, printed codes such as text, barcode, dataglyph, or punched card; and data codes such as may be embodied within a magnetic strip, holograph, computer readable media, etc.) or any other content of interest. The source document can be a government document, a newspaper, a printed document, an electronic document, a translated document, a document transcribed from speech, a legal document, an operations manual, a policy manual, a journal, an e-mail document, a paragraph, a section, a sentence or any other document having content that can be entered or read into a computer.

One skilled in the art will understand that the network transmits information (such as data for presentation as well as data that defines a computer program). The information is often embodied within a carrier-wave. The term "carrier-wave" includes electromagnetic signals, visible or invisible light pulses, signals on a data bus, or signals transmitted over any wire, wireless, or optical fiber technology that allows information to be transmitted over a network. Computer programs and data can also be transmitted over a network in the absence of a carrier-wave. Programs and data are commonly read from both tangible physical media (such as a compact, floppy, or magnetic disk) and from a network. Thus, the network, like tangible physical media, is a computer-usable data carrier.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein.

What is claimed follows:

1. A computer controlled method for adding terms to a probabilistic latent semantic analysis (PLSA) model trained by applying an expectation maximization algorithm utilizing a set of expectation maximization equations corresponding to a PLSA model based on using P(z|w), the method comprising:

identifying by a processor, at least one new term w from a document d to be added to said trained PLSA model;

incrementally adding said at least one new term to said trained PLSA model, the incrementally adding step including applying said expectation maximization algorithm utilizing only a subset comprising at least one of said expectation maximization equations, wherein parameters dependent on the new term w and the document d are used in the incrementally adding step, the set of expectation maximization equations comprising:

$$P(z|d,w) = \frac{P(z|d)P(z|w)/P(z)}{\sum_{z'} P(z'|d)P(z'|w)/P(z')};$$

$$P(z|w) = \frac{\sum_{d} f(d,w)P(z|d,w)}{\sum_{d,z'} f(d,w)P(z'|d,w)};$$

$$P(z|d) = \frac{\sum_{w} f(d,w)P(z|d,w)}{\sum_{w,z'} f(d,w)P(z'|d,w)}; \text{ and}$$

$$P(z) = \frac{\sum_{d,w} f(d,w)P(z|d,w)}{\sum_{d,w} f(d,w)},$$

wherein P(z) represents a probability of a latent class z, P(z|d) represents a probability of a latent class z given a document d, P(z|w) represents a probability of a latent class z given a term w, and f(d,w) represents the number of times the term w occurs in the document d; and wherein the incrementally adding said at least one new term further comprises:

keeping track of a total count N, wherein:

$$N^{adj} = N^{old} + \sum_{d^{new} \in D^{new}} \sum_{w \in W^{old} \cup W^{new}} f(d^{new}, w);$$

$$P^{adj}(z) = \frac{N^{old} P^{old}(z) + \sum_{d^{new} \in D^{new}} \sum_{w \in W^{old} \cup W^{new}} f(d^{new}, w) P(z \mid d^{new}, w)}{N^{adj}};$$

and wherein $N^{adj}$ represents an adjusted value of N, $N^{old}$ represents the previous value of N, $d^{new}$ represents the new document d, $D^{new}$ represents a collection of new documents D, $W^{old}$ represents a previous set of terms W, $W^{new}$ represents a new set of terms which replaces W, $P^{old}(z)$ represents the previous value of P(z), and $P^{adj}(z)$ represents a new value of P(z) which replaces the previous value of P(z); and presenting a model parameter from said trained PLSA model, the presented model parameter including at least one of an updated P(z|d) value and an updated P(z|w) value.

2. The computer controlled method of claim 1, wherein a plurality of new terms includes said at least one new term and further comprising retraining said trained PLSA model after adding said plurality of new terms to said trained PLSA model.

3. The computer controlled method of claim 1, wherein said at least one new term includes a plurality of new terms that are distributed over a plurality of documents.

4. The computer controlled method of claim 1, wherein the step of incrementally adding includes updating at least one P(z|d) parameter.

5. The computer controlled method of claim 1, wherein said trained PLSA model is parameterized by P(z|w) and the step of incrementally adding said at least one new term represented by $w_{new}$ comprises initializing a P(z|$w_{new}$) parameter for each of said at least one new term, wherein the P(z|$w_{new}$) parameter is the probability of the latent class z given the new term $w_{new}$.

6. The computer controlled method of claim 5, further comprising applying said expectation maximization algorithm parameterized by P(z|w) to said at least one new term and said set of trained terms.

7. The computer controlled method of claim 5, wherein the step of incrementally adding comprises updating at least one P(z|w) parameter.

8. The computer controlled method of claim 5 wherein the step of incrementally adding comprises updating at least one P(w) parameter.

9. The computer controlled method of claim 5, wherein the step of incrementally adding comprises updating at least one P(z) parameter.

10. The computer controlled method of claim 5, wherein the step of incrementally adding does not change either P(z|w) or P(z|d) values for P(z|w) and P(z|d) values in existence prior to the step of incrementally adding.

11. The computer controlled method of claim 5, wherein the step of incrementally adding does not change either P(z) or P(w) values for P(z) and P(w) values in existence prior to the step of incrementally adding.

12. The computer controlled method of claim 1, further comprising retraining said trained PLSA model using said at least one new term.

13. The computer controlled method of claim 1, wherein said at least one new term is from a source document having content relating to a news story, an investigation, a transcript, a patent, an advertisement, a statute, a contract, a legal document, a product, an advertisement, a person, a technology, a laboratory, a research center, a technical paper, a device, a policy, a translation, a digital image, a digitized audio, or any information encoded into a series of codes, wherein said source document can be a government document, a newspaper, a printed document, an electronic document, a translated document, a document transcribed from speech, a legal document, an operations manual, a policy manual, a journal, a data file, a web page or an electronic-mail document.

14. An apparatus having a central processing unit (CPU) and a memory coupled to said CPU comprising:

training logic configured to train a probabilistic latent semantic analysis (PLSA) model, the training logic further configured to apply an expectation maximization algorithm utilizing a set of expectation maximization equations corresponding to a PLSA model based on using P(z|w);

term identification logic configured to identify at least one new term w from a document d to be added to said trained PLSA model;

term addition logic configured to incrementally add said at least one new term to said trained PLSA model, the term addition logic further configured to apply said expectation maximization algorithm utilizing only a subset comprising at least one of said expectation maximization equations, wherein parameters dependent on the new term w and the document d are used by the term addition logic, the set of expectation maximization equations comprising:

$$P(z \mid d, w) = \frac{P(z \mid d) P(z \mid w) / P(z)}{\sum_{z'} P(z' \mid d) P(z' \mid w) / P(z')};$$

$$P(z \mid w) = \frac{\sum_{d} f(d, w) P(z \mid d, w)}{\sum_{d, z'} f(d, w) P(z' \mid d, w)};$$

$$P(z \mid d) = \frac{\sum_{w} f(d, w) P(z \mid d, w)}{\sum_{w, z'} f(d, w) P(z' \mid d, w)}; \text{ and}$$

$$P(z) = \frac{\sum_{d, w} f(d, w) P(z \mid d, w)}{\sum_{d, w} f(d, w)},$$

wherein P(z) represents a probability of a latent class z, P(z|d) represents a probability of a latent class z given a document d, P(z|w) represents a probability of a latent class z given a term w, and f(d,w) represents the number of times the term w occurs in the document d, and wherein the term addition logic is further configured to keep track of a total count N when incrementally adding said at least one new term, wherein:

$$N^{adj} = N^{old} + \sum_{d^{new} \in D^{new}} \sum_{w \in W^{old} \cup W^{new}} f(d^{new}, w);$$

$$P^{adj}(z) = \frac{N^{old} P^{old}(z) + \sum_{d^{new} \in D^{new}} \sum_{w \in W^{old} \cup W^{new}} f(d^{new}, w) P(z \mid d^{new}, w)}{N^{adj}};$$

and wherein $N^{adj}$ represents an adjusted value of N, $N^{old}$ represents the previous value of N, $d^{new}$ represents the new document d, $D^{new}$ represents a collection of new documents D, $W^{old}$ represents a previous set of terms W, $W^{new}$ represents a new set of terms which replaces W, $P^{old}(z)$ represents the previous value of P(z), and $P^{adj}(z)$ represents a new value of P(z) which replaces the previous value of P(z); and presentation logic configured to present a model parameter from said trained PLSA model, the presented model parameter including at least one of an updated P(z|d) value and an updated P(z|w) value.

15. The apparatus of claim 14, wherein a plurality of new terms includes said at least one new term and further comprising retraining logic configured to retrain said trained PLSA model after adding said plurality of new terms to said trained PLSA model.

16. apparatus of claim 14, wherein said at least one new term includes a plurality of new terms that are distributed over a plurality of documents.

17. The apparatus of claim 14, wherein the term addition logic includes update logic configured to update at least one P(z|d) parameter.

18. The apparatus of claim 14, wherein said trained PLSA model is parameterized by P(z|w) and the term addition logic comprises initialization logic configured to initialize a $P(Z|W_{new})$ parameter for each of said at least one new term, wherein the $P(z|w_{new})$ parameter is the probability of the latent class z given the new term $w_{new}$.

19. The apparatus of claim 18, further comprising expectation maximization logic configured to apply said expectation maximization algorithm parameterized by P(z|w) to said at least one new term and said set of trained terms.

20. apparatus of claim 18, wherein the term addition logic comprises update logic configured to update at least one P(z|w) parameter.

21. apparatus of claim 18, wherein the term addition logic comprises update logic configured to update at least one P(w) parameter.

22. apparatus of claim 18, wherein the term addition logic comprises update logic configured to update at least one P(z) parameter.

23. apparatus of claim 18, wherein the term addition logic does not change either P(z|w) or P(z|d) values for P(z|w) and P(z|d) values in existence prior to the operation of the term addition logic.

24. apparatus of claim 18, wherein the term addition logic does not change either P(z) or P(w) values for P(z) and P(w) values in existence prior to prior to the operation of the term addition logic.

25. apparatus of claim 14, further comprising retraining logic configured to retrain said trained PLSA model using said at least one new term.

26. apparatus of claim 14, wherein said at least one new term is from a source document having content relating to a news story, an investigation, a transcript, a patent, an advertisement, a statute, a contract, a legal document, a product, an advertisement, a person, a technology, a laboratory, a research center, a technical paper, a device, a policy, a translation, a digital image, a digitized audio, or any information encoded into a series of codes, wherein said source document can be a government document, a newspaper, a printed document, an electronic document, a translated document, a document transcribed from speech, a legal document, an operations manual, a policy manual, a journal, a data file, a web page or an electronic-mail document.

* * * * *